United States Patent
Kumar et al.

(10) Patent No.: US 9,393,538 B2
(45) Date of Patent: Jul. 19, 2016

(54) PROCESS AND APPARATUS FOR SELECTIVELY HYDROGENATING NAPHTHA

(71) Applicant: UOP LLC, Des Plaines, IL (US)

(72) Inventors: Avnish Kumar, Rajasthan (IN); Steven F. Zink, Westmont, IL (US); Soumendra M. Banerjee, New Delhi (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/511,942

(22) Filed: Oct. 10, 2014

(65) Prior Publication Data

US 2016/0101404 A1    Apr. 14, 2016

(51) Int. Cl.
| | | |
|---|---|---|
| *B01J 8/04* | (2006.01) | |
| *C10G 67/04* | (2006.01) | |
| *C10G 67/10* | (2006.01) | |
| *C10G 65/02* | (2006.01) | |
| *C10G 49/00* | (2006.01) | |

(52) U.S. Cl.
CPC .............. *B01J 8/0449* (2013.01); *B01J 8/0453* (2013.01); *C10G 49/002* (2013.01); *C10G 65/02* (2013.01); *C10G 67/0427* (2013.01); *C10G 67/10* (2013.01)

(58) Field of Classification Search
CPC ... C10G 67/0427; C10G 67/10; B01J 8/0446; B01J 8/0449; B01J 8/053
See application file for complete search history.

(56) References Cited

U.S. PATENT DOCUMENTS

| | | | |
|---|---|---|---|
| 2,988,500 A * | 6/1961 | Gleim | C07C 321/00 208/203 |
| 4,140,626 A | 2/1979 | Bertolacini et al. | |
| 4,314,901 A | 2/1982 | Nowack et al. | |
| 4,720,600 A | 1/1988 | Beech, Jr. et al. | |
| 5,290,427 A * | 3/1994 | Fletcher | C10G 69/08 208/212 |
| 5,985,136 A | 11/1999 | Brignac et al. | |
| 6,676,829 B1 * | 1/2004 | Angevine | C10G 45/52 208/210 |
| 7,431,827 B2 | 10/2008 | Rock et al. | |
| 7,589,244 B2 | 9/2009 | Coupard et al. | |
| 7,638,041 B2 | 12/2009 | Boyer et al. | |
| 7,678,953 B2 | 3/2010 | Kuechler et al. | |
| 8,314,276 B2 | 11/2012 | Petri et al. | |
| 2004/0188327 A1 * | 9/2004 | Groten | C10G 19/02 208/210 |

(Continued)

FOREIGN PATENT DOCUMENTS

| | | |
|---|---|---|
| AU | 513580 B2 | 12/1980 |
| CN | 1224675 C | 10/2005 |
| CN | 1234815 C | 1/2006 |

(Continued)

OTHER PUBLICATIONS

Bataille, "Sulfided Mo and CoMo supported on zeolite as hydrodesulfurization catalysts: transformation of dibenzothiophene and 4,6-dimethyldibenzothiophene", Applied Catalysis A: General 220 (2001) 191-205.

(Continued)

*Primary Examiner* — Lessanework Seifu (57) ABSTRACT

The process and apparatus of the present invention selectively hydrogenates a heavier olefinic naphtha stream in an upstream catalyst bed and the hydrogenated effluent and a lighter olefinic naphtha stream in a downstream catalyst bed. The heavier di-alkenes are less re-active and are contacted with more hydrogenation catalyst than the lighter di-alkenes which are more re-active.

11 Claims, 5 Drawing Sheets

(56) References Cited

U.S. PATENT DOCUMENTS

| | | | | |
|---|---|---|---|---|
| 2012/0108866 | A1* | 5/2012 | Grenoble | C10G 45/02 585/259 |
| 2012/0255885 | A1 | 10/2012 | Sechrist et al. | |

FOREIGN PATENT DOCUMENTS

| | | |
|---|---|---|
| CN | 101270301 A | 9/2008 |
| CN | 101787307 A | 7/2010 |
| CN | 102851069 A | 1/2013 |
| CN | 103059947 A | 4/2013 |
| CN | 103059956 A | 4/2013 |
| CN | 103059958 A | 4/2013 |
| CN | 103059964 A | 4/2013 |
| CN | 103059965 A | 4/2013 |
| EP | 1857527 A1 | 11/2007 |
| GB | 1125889 A | 9/1968 |
| GB | 1276920 A | 6/1972 |
| JP | 2000117112 A2 | 4/2000 |
| KR | 1209347 B1 | 12/2012 |
| WO | 03091363 A1 | 11/2003 |
| WO | 2014013153 A1 | 1/2014 |

OTHER PUBLICATIONS

Chu, "Development of new generation catalysts for selective hydrodesulfurization of FCC naphtha", China Petroleum Processing and Petrochemical Technology, n 1, p. 19-23, Mar. 2009.

Gao, "Study on operation conditions of light hydrocarbon selective hydrogenation", Petroleum Refinery Engineering, v 34, n 12, p. 15-18, Dec. 25, 2004; Language: Chinese (abstract only).

Ge, "Activation and Hydrodesulfurization Activity of MoO3/Al2O3 Catalyst Presulfided by Ammonium Thiosulfate", Chin J Catal, 2008, 29(9): 921-927.

Greeley, "Selective Cat Naphtha Hydrofining with Minimal Octane Loss", ACS Division of Petroleum Chemistry, Inc. Preprints, v 45, n 2, p. 357-360, Mar. 2000; Conference: ACS 219th National Meeting, Mar. 26, 2000-Mar. 31, 2000.

Jess, "Improving deep sulfur removal from motor fuels by the use of a presaturator and a liquid circuit", Chemie-Ingenieur-Technik, v 75, n 8, p. 1040, Aug. 2003; Language: German.

Jia, "Preparation and evaluation of a selective hydrodesulfurization catalyst for FCC gasoline", Petroleum Processing and Petrochemicals, v 41, n 12, p. 34-37, Dec. 2010; Language: Chinese (abstract only).

Li, "Options of selective hydrodesulfurization process scheme for treating FCC gasoline", Petroleum Processing and Petrochemicals, v 41, n 5, p. 1-6, May 2010; Language: Chinese (abstract only).

Li, "Selective hydrodesulfurization technology of cracked gasoline for gasoline pool in 2005", Studies in Surface Science and Catalysis, v 127, p. 409-412, 1999; Conference: 2nd International Symposium/7th European Workshop Hydrotreatment and Hydrocracking of Oil Fractions, Nov. 14, 1999-Nov. 17, 1999.

Parkinson, "Gasoline sulfur reduction without octane loss", Chemical Engineering, v 107, n 5, p. 21, May 2000.

Song, "Application of full-range FCC gasoline selective hydrodesulfurization technology in a revamped unit", Petroleum Processing and Petrochemicals, v 43, n 9, p. 58-61, Sep. 2012; Language: Chinese (abstract only).

Toba, "Selective hydrodesulfurization of FCC gasoline over CoMo/al2O3 sulfide catalysts", ACS Division of Fuel Chemistry, Preprints, v 49, n 2, p. 509-510, Fall 2004.

Wen, "Effect of alumina modified by zno/cu on the selective hydrodesulfurization of FCC naphtha", Petroleum Processing and Petrochemicals, v 42, n 2, p. 47-51, Feb. 2011; Language: Chinese (abstract only).

Xie, "Analysis of operation mode for FCC gasoline hydrodesulfurization system", Petroleum Processing and Petrochemicals, v 44, n 11, p. 71-74, Nov. 2013; Language: Chinese (abstract only).

Zhang, "Development and commercial application of CDOS-H technology for selective hydrodesulfurization of FCC naphtha", Petroleum Refinery Engineering, v 40, n 2, p. 10-12, 2010; Language: Chinese (abstract only).

Zhao, "OCT-M FCC gasoline selective hydrodesulfurization technology", Petroleum Refinery Engineering, v 34, n 2, p. 6-8, Feb. 25, 2004; Language: Chinese (abstract only).

Zhao, "Development of OCT-ME technology for ultra deep selective desulfurization of FCC gasoline", Petroleum Processing and Petrochemicals, v 43, n 8, p. 13-16, Aug. 2012; Language: Chinese (abstract only).

Zhou, "Optimization design of selective hydrodesulfurization process for FCC naphtha", Petroleum Refinery Engineering, v 39, n 7, p. 23-26, 2009; Language: Chinese (abstract only).

U.S. Appl. No. 14/511,877, filed Oct. 10, 2014.

\* cited by examiner

PROCESS AND APPARATUS FOR SELECTIVELY HYDROGENATING NAPHTHA

FIELD

The field relates to selective hydrogenation of di-alkenes and alkynes without saturating mono-mono-alkenes in a naphtha stream.

BACKGROUND

Due to environmental concerns and newly enacted rules and regulations, petroleum products are expected to meet lower and lower limits on contaminants, such as sulfur and nitrogen. New regulations require the removal of sulfur compositions from liquid hydrocarbons, such as those used in gasoline, diesel fuel, and other transportation fuels. For example, US EPA Tier 3 gasoline regulations will permit up to about 10 ppm sulfur in gasoline.

Hydrodesulfurization is a hydrotreating process often used for removal of sulfur from olefinic naphtha streams by converting sulfur in the feed to hydrogen sulfide via contact with suitable catalysts. The value of naphtha is dependent upon its octane value. Octane is increased by the presence of monoalkenes. However, di-alkenes and alkynes present a processing problem in a hydrodesulfurization reactor because they easily polymerize and gum up equipment and transport lines and deactivate hydrodesulfurization catalyst. High temperature processing of olefinic naphtha, however, may result in a lower grade fuel due to saturation of mono-alkenes leading to an octane loss.

A selective hydrogenation reactor is typically provided upstream of a hydrodesulfurization reactor to remove di-alkenes and alkynes while minimizing mono-alkenes saturation. Better processes and apparatuses are needed for selective hydrogenation of di-alkenes and alkynes.

SUMMARY OF THE INVENTION

In an apparatus embodiment, an apparatus for selective hydrogenation comprises a fractionation column for producing a lighter naphtha stream at a lighter outlet and a heavy naphtha stream at a second outlet at a location in the column below the lighter outlet. A selective hydrogenation reaction zone has a first inlet in downstream communication with the second outlet and a second inlet downstream of the first inlet and in downstream communication with the lighter outlet. In an aspect, the first inlet is out of communication with the lighter outlet.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottoms temperature is the liquid bottoms outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "T5" or "T95" means the temperature at which 5 volume percent or 95 volume percent, as the case may be, respectively, of the sample boils using ASTM D-86.

As used herein, the term "cut point" means the temperature at which the T95 of the lighter material and a T5 of a heavier material are the same.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "a component-rich stream" means that the rich stream coming out of a vessel has a greater concentration of the component than the feed to the vessel.

DETAILED DESCRIPTION OF THE INVENTION

A selective hydrogenation reactor provided upstream of a hydrodesulfurization reactor selectively saturates di-alkenes and alkynes via selective hydrogenation, converts light mercaptans into heavy sulfides via thioetherification reactions between mercaptans and mono-alkenes and/or di-alkenes, and isomerizes external mono-alkene double bonds into internal mono-alkene double bonds by isomerization reactions. In the selective hydrogenation of the di-alkenes, there are three competing reactions: a) di-alkenes saturation, b) alkenes double-bond isomerization, and c) mono-alkenes saturation. Therefore, some mono-alkene loss also occurs, especially at higher conversion of the di-alkenes into mono-alkenes, especially greater than 50%. Any loss in the mono-alkenes content causes the road motor octane loss, so it is undesirable.

Lighter di-alkenes are more active than heavier di-alkenes. Therefore, the lighter di-alkenes show higher conversion compared to the heavier di-alkenes at a given selective hydrogenation reactor temperature. Similarly, lighter mono-alkenes are more active compounds than heavier mono-alkenes. The process and apparatus disclosed herein selectively hydrogenates a heavier olefinic naphtha stream in an upstream catalyst bed and the hydrogenated effluent and a lighter olefinic naphtha stream in a downstream catalyst bed.

The process may begin with two naphtha streams comprising a lighter naphtha stream and a heavy naphtha stream. The lighter naphtha stream may have an initial boiling point (IBP) in the $C_5$ range; i.e., between about 24° C. (75° F.) and about 35° C. (95° F.), and an end point (EP) between about 55° C. (131° F.), preferably about 60° C. (140° F.), and about 75° C. (167° F.). The heavy naphtha stream may have an IBP between about 55° C. (131° F.), preferably about 60° C. (140° F.), and about 75° C. (167° F.), and an EP between about 149° C. (300° F.) and about 232° C. (450° F.). Hence, the cut point between the lighter naphtha stream and the heavy naphtha stream is between about 55, preferably 60, and about 75° C.

The lighter naphtha stream and the heavy naphtha stream may be separated from a debutanized FCC naphtha stream having an initial boiling point (IBP) in the $C_5$ range; i.e., between about 24° C. (75° F.) and about 35° C. (95° F.), and an end point (EP) between about 149° C. (300° F.) and about 232° C. (450° F.). The naphtha stream may contain di-alkenes in the range of 300 wt-ppm to 2.0 wt %. The types of di-alkenes present may be conjugated and non-conjugated and cumulated. The greater the di-alkene concentration of the naphtha stream, particularly $C_5$-$C_6$ di-alkenes, the more mono-alkenes that can be conserved to preserve the octane rating of the product naphtha stream produced by this process and apparatus.

Figure 1:
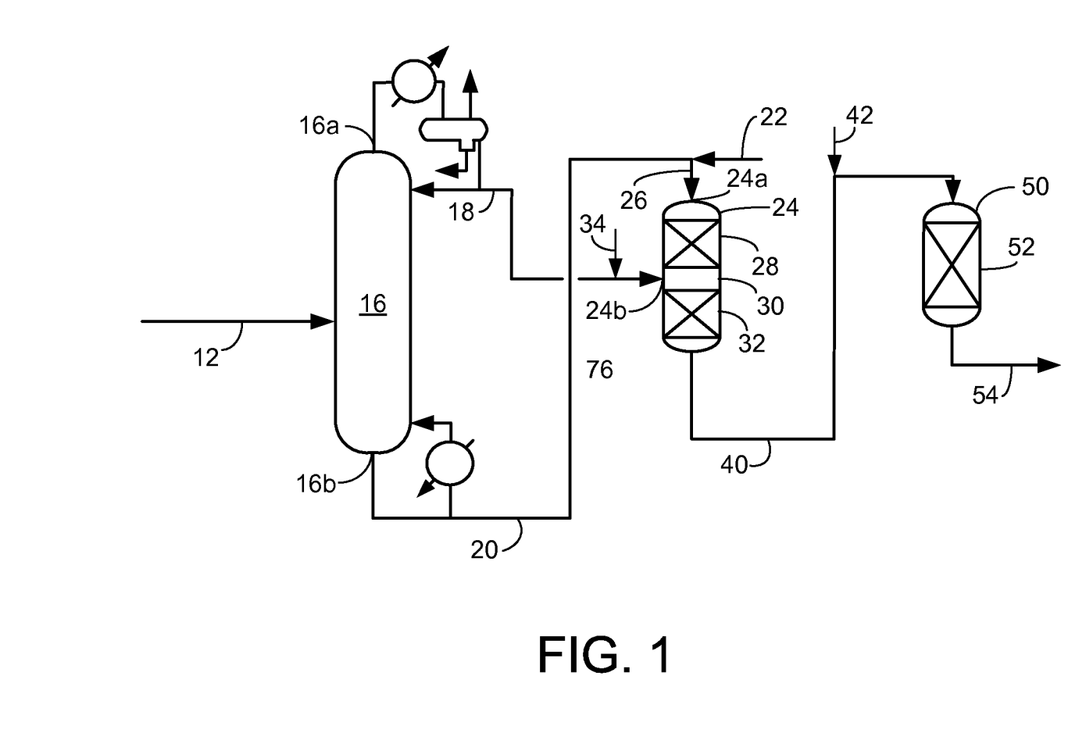
FIG. 1 is a schematic process flow diagram illustrating the process and apparatus of the present invention.

As shown in FIG. 1, the debutanized naphtha stream 12 is fed to a naphtha splitter fractionation column 16. In an embodiment, the naphtha splitter fractionation column 16 may be in downstream communication with a bottom of a debutanizer column (not shown). In the naphtha splitter fractionation column 16, a light naphtha stream, typically a $C_5$-$C_6$ or a $C_5$-$C_7$ stream is recovered from the overhead outlet 16a comprising the lighter outlet after condensing, flashing and refluxing in a net overhead line 18 to comprise the lighter naphtha stream. Heavy naphtha is taken from the bottoms outlet comprising the heavy outlet 16b in bottoms line 20 typically comprising C7+ naphtha. A heavy outlet 16b is located in the column below the lighter outlet 16a. The naphtha splitter fractionation column may be operated with a top pressure of about 69 to about 448 kPa (gauge) (10 to 65 psig) and a bottom temperature of about 121° to about 232° C. (250° to 450° F.).

The heavy naphtha stream has the less active di-alkenes and is subjected to all of the selective hydrogenation catalyst. The heavy naphtha stream in bottoms line 20 may be mixed with hydrogen supplied from line 22 and enter a selective hydrogenation reactor 24 through a first feed line 26. The heavy naphtha stream mixed with hydrogen may be fed through a first inlet 24a in downstream communication with the heavy outlet 16b to a first bed 28 of selective hydrogenation catalyst.

Conversion of di-alkenes and alkynes to mono-alkenes in the selective hydrogenation reactor 24 may be accomplished over a conventional selective hydrogenation catalyst which may comprises an alumina support material preferably having a total surface area greater than 150 $m^2$/g, with most of the total pore volume of the catalyst provided by pores with an average diameter of less than about 600 angstroms, and containing surface deposits of about 4 to 14 wt % of a Group VIII metal such as nickel and optionally about 2 to about 9 wt % of a Group VI metal such as molybdenum.

The selective hydrogenation process is normally performed at relatively mild hydrogenation conditions. These conditions will normally result in the naphtha being present in liquid phase. The naphtha stream will normally be maintained under the minimum pressure sufficient to maintain the reactants as liquid phase hydrocarbons which allows the hydrogen to dissolve into the naphtha feed. A broad range of suitable operating pressures therefore extends from about 276 kPa gauge (40 psig), to 5516 kPa gauge (800 psig), with a pressure between about 345 kPa gauge (50 psig) and 3102 kPa gauge (450 psig) being preferred. A relatively moderate temperature between about 25° C. (77° F.) and about 350° C. (662° F.) should be employed. Preferably, the temperature of the selective hydrogenation reactor is maintained between about 30° C. (122° F.) and about 200° C. (392° F.). The liquid hourly space velocity of the reactants through the selective hydrogenation catalyst should be above 1.0 hr-1. Preferably, it is above 5.0 and more preferably it is between 5.0 and 15.0 hr-1.

The ratio of hydrogen to di-alkene hydrocarbons maintained within the selective hydrogenation zone is an important variable. The amount of hydrogen required to achieve a certain conversion is believed dependent upon both reactor temperature and the molecular weight of the feed naphtha. To avoid the undesired saturation of a significant amount mono-alkene hydrocarbons, the mole ratio of hydrogen to di-alkene hydrocarbons in the naphtha feed entering the bed of selective hydrogenation catalyst is maintained between 1:1 and 5.0:1. The optimum set of conditions will of course vary depending on such factors as the composition of the naphtha stream and the degree of saturation of di-alkene hydrocarbons which is desired.

The hydrogenation reactor is preferably a cylindrical fixed bed of catalyst through which the reactants move in a vertical direction. The hydrogenation catalyst may be present within the reactor as pellets, spheres, extrudates, irregular shaped granules, etc. To employ the hydrogenation catalyst, the reactants preferably would be brought to the desired inlet temperature of the reaction zone, admixed with hydrogen and then passed into and through the reactor. Alternatively, the reactants may be admixed with the desired amount of hydrogen and then heated to the desired inlet temperature.

The heavy naphtha stream is selectively hydrogenated over a first bed 28 of hydrogenation catalyst to produce a heavy hydrogenated naphtha stream with a lower concentration of di-alkenes. The selective hydrogenation reactor 24 may comprise one bed, two beds, several beds, or multiple reactors. The selective hydrogenation reactor may be termed a selective hydrogenation zone 24. It is important that the heavy naphtha stream is fed to the reactor upstream of the lighter naphtha stream, so that the heavy naphtha contacts a greater proportion of the selective hydrogenation catalyst than the lighter naphtha stream. In an aspect, the heavy naphtha stream contacts all of the selective hydrogenation catalyst; whereas, the lighter naphtha stream contacts less than all of the selective hydrogenation catalyst. In an embodiment, the first inlet 24a and the second inlet 24b to the selective hydrogenation reaction zone are in the same vessel or reactor 24. In an additional embodiment, the first inlet 24a is upstream of the second inlet 24b. In a further embodiment, the first inlet 24a is above the second inlet 24b.

The lighter naphtha stream in line 18 containing di-alkenes and having an end point that is lower than the first end point is fed to the selective hydrogenation reactor 24 at a second inlet 24b that is downstream of the first inlet 24a and in downstream communication with the lighter outlet 16a. The lighter naphtha stream may be fed to the selective hydrogenation reactor 24 at an interbed location 30 between the first bed 28 and a second bed 32 of selective hydrogenation catalyst to quench the heavy hydrogenated product stream exiting the first bed 28. Downstream of the second inlet 24b, the interbed location 30 and/or over the second bed 32, the heavy hydrogenated naphtha stream and the lighter naphtha stream are selectively hydrogenated to produce a product naphtha stream depleted of di-alkenes in line 40. In selective hydrogenation, mercaptans are alkylated to sulfides and mono-alkene external double bonds convert to internal double bonds, in addition to conversion of di-alkenes and alkynes to mono-alkenes. The product naphtha stream in line 40 from the selective hydrogenation reactor 24 will preferably have less than 100 ppm of di-alkenes.

The lighter naphtha stream, including lighter paraffins, mono-alkenes, di-alkenes and sulfur compounds bypasses the first inlet 24a and hence the first bed 28. Consequently, the lighter outlet 16a is out of communication with the first inlet 24a. The lighter naphtha stream spends less contact time with the catalyst, thereby having a higher space velocity than the heavy naphtha stream. As a result, incidental or secondary saturation of the lighter mono-alkenes can be minimized, so the road octane loss will also be minimized. Another benefit is that the more reactive di-alkenes in the lighter naphtha stream are diluted by the selectively hydrogenated heavy naphtha stream effluent of the first bed 28 or upstream catalyst. Consequently, overall polymerization of the di-alkenes and gum deposition will be less than the case if the entire naphtha stream were fed directly to the selective hydrogenation reactor. The benefit of dilution is realized as a longer run length for the selective hydrogenation catalyst, by reduced pressure drop increase over time. Another benefit of the arrangement is the lighter naphtha stream in line 18 may act as quench between the first bed 28 and the second bed 32 or between the first inlet 24a and the second inlet 24b of the selective hydrogenation reactor 24. Quenching helps maintain similar temperatures in the first bed 28 and the second bed 32 or between upstream and downstream locations in the selective hydrogenation reactor 24.

A hydrogen stream in line 34 may be added to the lighter naphtha stream 18 before selective hydrogenation. Hydrogen addition may not be necessary if sufficient excess hydrogen is added to the heavy naphtha stream 26 from line 22.

The product naphtha stream is depleted of di-alkenes but will still have more sulfur than specifications allow. Hence, the product naphtha stream in line 40 may be fed to a hydrodesulfurization reactor 50 to further convert organic sulfur to hydrogen sulfide. The hydrodesulfurization reactor 50 may be in downstream communication with the selective hydrogenation reaction zone 24. A hydrogen stream may be added to the product naphtha stream in line 40 from line 42 prior to hydrodesulfurization.

The hydrodesulfurization reactor may comprise one or more beds 52 of hydrodesulfurization catalyst. The hydrodesulfurization catalyst may have a support that comprises an inorganic oxide such as alumina. Catalytic desulfurization metals that can be deposited on the support include from about 2 to about 20 wt % Group VI or Group VIII metals such as cobalt, nickel, molybdenum and/or tungsten. The layered sphere catalyst of U.S. Pat. No. 7,629,289 may be a suitable hydrodesulfurization catalyst.

Hydrodesulfurization conditions preferably include a temperature from about 240° C. (400° F.) to about 399° C. (750° F.) and a pressure from about 790 kPa (100 psig) to about 4 MPa (500 psig). The hydrodesulfurization process using the catalysts of the present invention typically begins with heating the product naphtha stream. The product naphtha stream can be contacted with a hydrogen stream prior to, during or after preheating. The hydrogen stream may also be added in the hydrodesulfurization reaction zone. The hydrogen stream purity is preferably at least about 65 vol % hydrogen and more preferably at least 75 vol % hydrogen for best results. Desulfurized naphtha is provided in gasoline stream 54. It is also contemplated that the desulfurized naphtha be fed to a polishing hydrodesulfurization reactor to upgrade naphtha octane by decomposing mercaptans that have been generated by the recombination of mono-alkenes and hydrogen sulfide. The desulfurized naphtha stream can be separated from hydrogen which can be scrubbed of hydrogen sulfide in an absorber and recycled in lines 22, 34 and 42 to supply hydrogenation needs. The desulfurized gasoline stream in line 54 can be delivered to product fractionation or to supply the gasoline pool.

Figure 2:
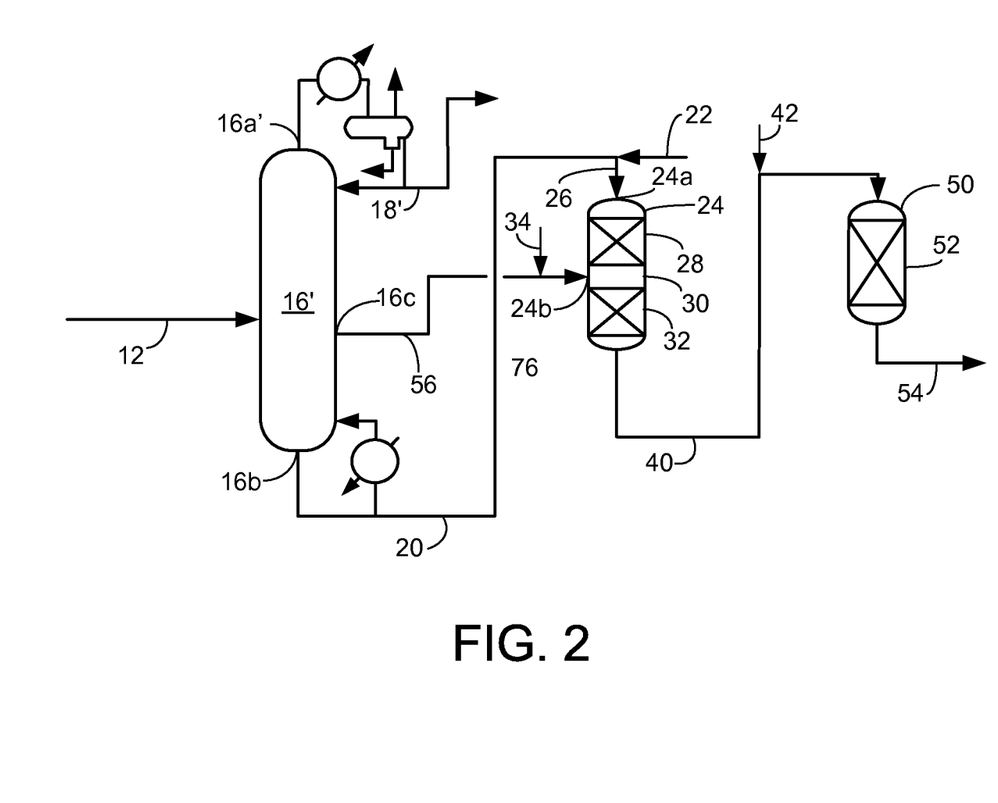
FIG. 2 is a schematic process flow diagram illustrating an alternative process and apparatus of the present invention.

FIG. 2 illustrates an alternative embodiment in which a naphtha splitter fractionation column provides three naphtha streams. Many of the elements in FIG. 2 have the same configuration as in FIG. 1 and bear the same reference number. Elements in FIG. 2 that correspond to elements in FIG. 1 but have a different configuration bear the same reference numeral as in FIG. 1 but are marked with a prime symbol 0.

In FIG. 2, the naphtha splitter fractionation column 16' has a third side outlet comprising a lighter outlet 16c for producing an intermediate naphtha stream in line 56. The naphtha splitter fractionation column 16' may separate the naphtha stream in line 12 into a light naphtha stream in line 18', an intermediate naphtha stream which is a lighter naphtha stream in line 56, and a heavy naphtha stream in line 20.

In this embodiment, the intermediate naphtha stream in line 56 is the lighter naphtha stream instead of the overhead naphtha stream in overhead line 18'. An overhead outlet 16a' is positioned at a location in the naphtha splitter fractionation column 16' above the lighter outlet 16c.

The light naphtha stream in the net overhead line 18' can be cut such that it has sufficiently little organic sulfur concentration and can be blended in a gasoline pool without further treatment. Hence, overhead line 18' carrying light naphtha may bypass the selective hydrogenation reactor 24 and the hydrodesulfurization reactor 50.

The light naphtha stream in the net overhead line 18' may have an initial boiling point (IBP) in the $C_5$ range; i.e., between about 24° C. (75° F.) and about 35° C. (95° F.), and an end point (EP) between about 45° C. (113° F.) and about 55° C. (131° F.). The lighter naphtha stream which may be an intermediate naphtha steam in side cut line 56 may have an IBP between about 45° C. (113° F.) and about 55° C. (131° F.) and an EP between about 55° C. (131° F.), preferably about 60° C. (140° F.), and about 75° C. (167° F.). The heavy naphtha stream may have an IBP between about 55° C. (131° F.), preferably about 60° C. (140° F.), and about 75° C. (167° F.), and an EP between about 149° C. (300° F.) and about 232° C. (450° F.). Hence, the cut point between the lighter naphtha stream and the heavy naphtha stream is between about 55, preferably 60, and about 75° C.

The heavy naphtha stream from the heavy outlet 16*b* having a first end point is fed to the first inlet 24*a* and selectively hydrogenated over hydrogenation catalyst to produce a heavy hydrogenated naphtha stream with a lower concentration of di-alkenes as described with respect to FIG. 1. The intermediate naphtha stream in line 56 from the lighter outlet 16*c* containing di-alkenes and having an end point that is lower than the first end point and comprising the lighter naphtha stream is fed to the selective hydrogenation reactor 24 at a second inlet 24*b* that is downstream of the first inlet 24*a* and in downstream communication with the lighter outlet 16*c*. With the stated exceptions, the description of the rest of FIG. 2 is the same as described for FIG. 1.

Figure 3:
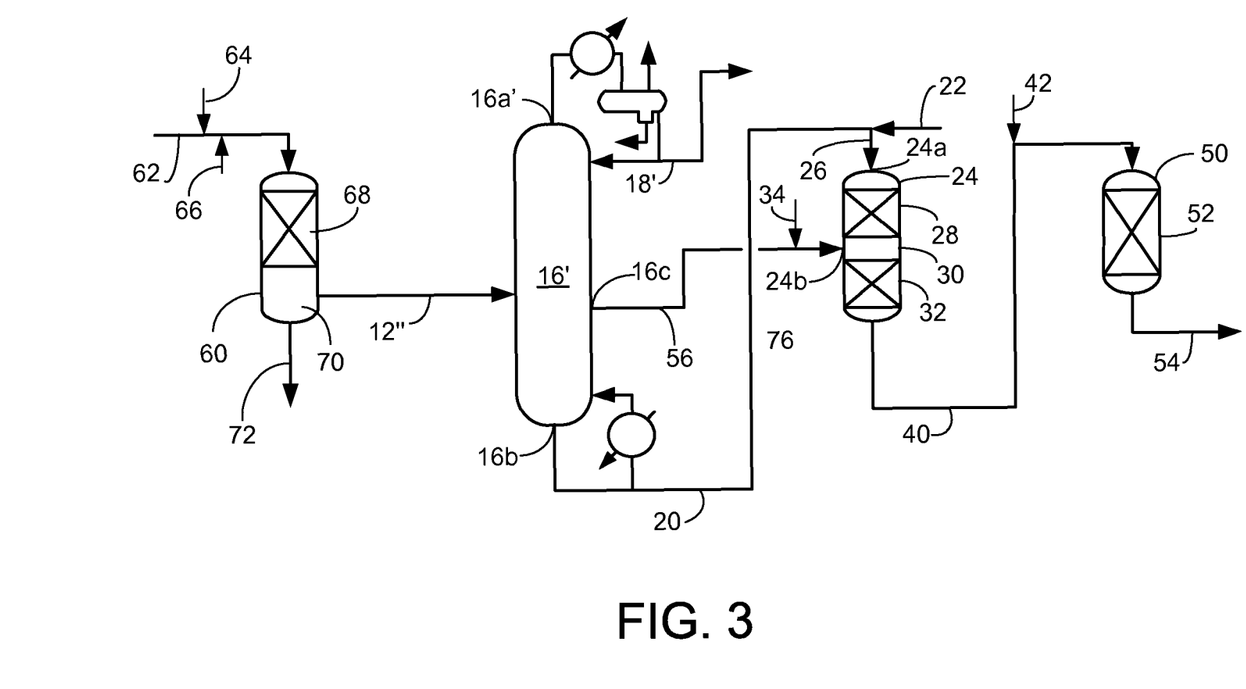
FIG. 3 is a schematic process flow diagram illustrating an additional alternative process and apparatus of the present invention.

FIG. 3 illustrates an alternative embodiment in which a mercaptan reactor 60 is in upstream communication with a naphtha splitter fractionation column 16'. Many of the elements in FIG. 3 have the same configuration as in FIG. 2 and bear the same reference number. Elements in FIG. 3 that correspond to elements in FIG. 2 but have a different configuration bear the same reference numeral as in FIG. 2 but are marked with a double prime symbol (").

In FIG. 3, the naphtha splitter provides three streams as in FIG. 2, but it may just provide two streams as in FIG. 1. A mercaptan reactor 60 is in upstream communication with the naphtha splitter fractionation column 16'. A debutanized naphtha stream as previously described with regard to line 12 in FIG. 1, is provided in line 62 and mixed with an oxygen containing stream such as air in line 64 and an alkaline stream which may be caustic in line 66 and is fed to the mercaptan reactor 60.

The mercaptan reactor 60 comprises a mercaptan catalyst bed 68 for contacting the naphtha stream with an alkaline stream over a catalyst in the presence of oxygen at reaction conditions effective to oxidize the mercaptans to disulfide compounds to form a alkaline-containing, sweetened naphtha stream that contains the disulfide compounds. The mercaptan reactor is in downstream communication with a source of alkaline from line 66.

A coalescing section 70 that may contain inert inorganic particulates, such as, sand, is disposed in the mercaptan reactor 60 downstream from the catalyst bed 68. The alkali-containing, sweetened naphtha stream is passed along to the coalescing section 70 and contacts the inert inorganic particulates to coalesce and efficiently separate alkali from the sweetened naphtha stream for forming a alkali-depleted, sweetened naphtha stream. The sweetened naphtha stream comprises naphtha boiling range hydrocarbons and disulfide compounds. The sweetened naphtha stream depleted of alkali is removed from the mercaptan reactor in line 12" and fed to the naphtha splitter fractionation column 16'. A separated alkaline stream is removed in line 72, and can be recycled to line 66 with or without intermediate regeneration of the alkaline stream.

The mercaptan catalyst may include the active catalyst component(s) impregnated on a solid material particulate. The catalyst may comprise a metal compound of tetrapyridino-porphyrazine or a metallic phthalocyanine retained on an inert granular support. The metal(s) of the metallic phthalocyanine may be titanium, zinc, iron, manganese, cobalt, and/or vanadium. The metal phthalocyanine may be employed as a derivative compound. Commercially available sulfonated compounds such as cobalt phthalocyanine monosulfonate, cobalt phthalocyanine disulfonate, and/or other mono-, di-, tri-, and tetra-sulfo derivatives may also be employed as the mercaptan catalyst. Other derivatives including carboxylated derivatives, as prepared by the action of trichloroacetic acid on the metal phthalocyanine, can also be used as the mercaptan catalyst. The inert granular support may be in the form of tablets, extrudates, spheres, or randomly shaped naturally occurring pieces. Natural materials such as clays and silicates or refractory inorganic oxides may be used as the support material. The support may be formed from diatomaceous earth, kieselguhr, kaolin, alumina, zirconia, or the like. In an exemplary embodiment, the catalyst comprises a carbon-containing support, such as, for example, charcoal that has been thermally and/or chemically treated to yield a highly porous structure similar to activated carbon. The active catalyst component(s) may be added to the support in any suitable manner, as by impregnation by dipping, followed by drying. In an exemplary embodiment, Merox No. 8, Merox No. 10, Merox No. 21, or Merox No. 31, which are commercially available from UOP LLC and comprise the active catalyst component(s) impregnated on a carbon support, is used as the catalyst.

It is also contemplated that the mercaptan reactor 60 be an mercaptan extraction reactor in which mercaptans are converted to organic sulfides without the presence of oxygen in which case line 64 is obviated. The organic sulfides are removed from the naphtha stream in the alkaline stream which can be regenerated by converting the organic sulfides to organic disulfides over an oxidation catalyst with oxygen present followed by separation and recycle of the alkaline stream.

The sweetened naphtha stream in line 12" may then be fed to the naphtha splitter fractionation column 16' and the process may continue as described in FIG. 1 or FIG. 2. The heavier disulfide compounds will be fractionated into the heavy naphtha stream in line 20. Other vessels may be provided on line 12" to prepare the sweetened naphtha stream, but these are not shown.

The description of the rest of FIG. 3 is as described for FIG. 2.

Figure 4:
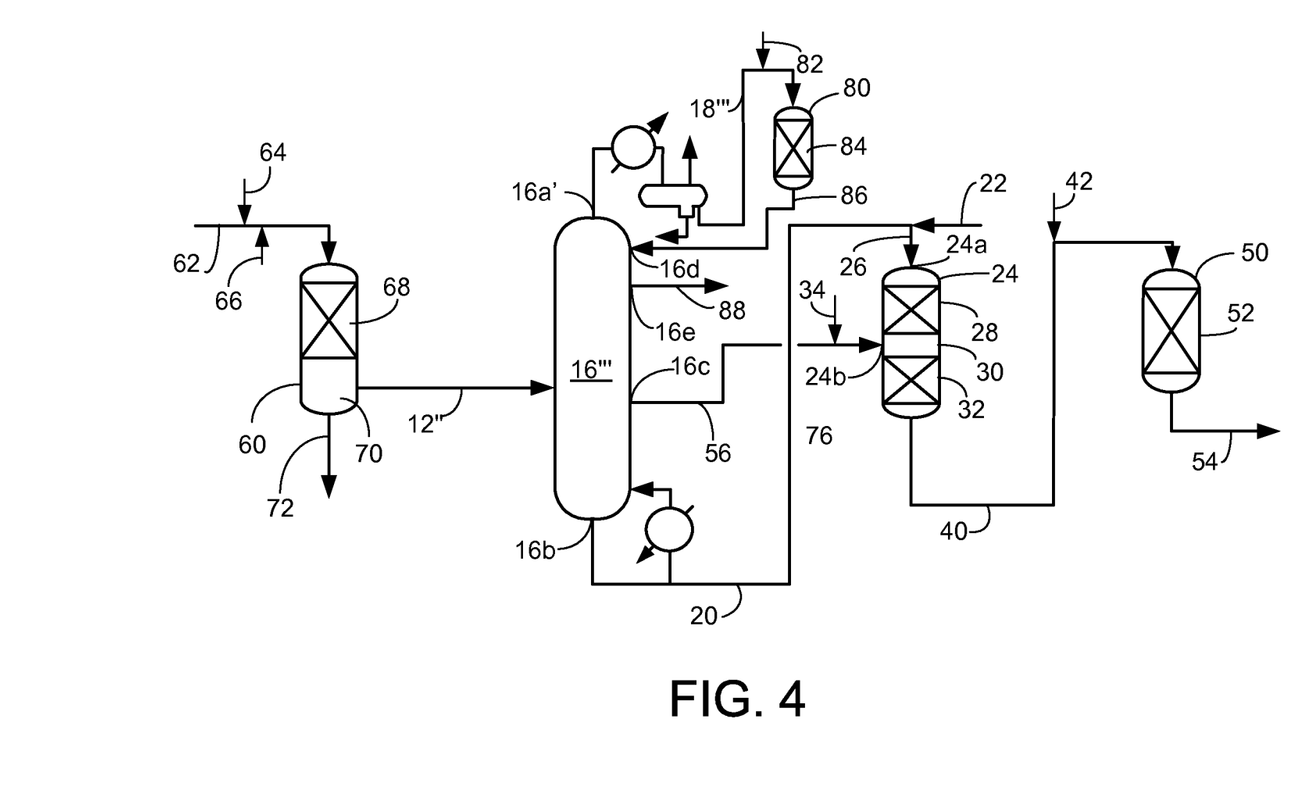
FIG. 4 is a schematic process flow diagram illustrating a further alternative process and apparatus of the present invention.

FIG. 4 illustrates an alternative embodiment in which the overhead line 18''' of the naphtha splitter fractionation column 16''' that provides three streams as in FIG. 2, is fed to an independent overhead selective hydrogenation reactor 80. Many of the elements in FIG. 4 have the same configuration as in FIG. 3 and bear the same reference number. Elements in FIG. 4, which correspond to elements in FIG. 3 but have a different configuration, bear the same reference numeral as in FIG. 3 but are marked with a triple prime symbol ('''). In FIG. 4, the mercaptan reactor 60 that is in upstream communication with the naphtha splitter fractionation column 16''' is optional.

The vapor overhead stream from outlet 16*a'* is condensed and flashed in a receiver to provide an overhead light naphtha stream in overhead naphtha line 18'. A hydrogen stream from line 82 is added to the overhead light naphtha stream in line 18' and the mixed stream is fed to an overhead selective hydrogenation reactor 80 which is in downstream communication with the overhead outlet 16*a'*. The light naphtha stream is selectively hydrogenated separately from selective hydrogenation of the heavy naphtha stream and the lighter naphtha stream to provide a hydrogenated light naphtha stream. The overhead selective hydrogenation reactor 80 operates similarly to the selective hydrogenation reactor 24 in terms of reaction conditions and catalyst, but it need not receive two feed streams. Di-alkenes and alkynes in the overhead naphtha stream are selectively hydrogenated over the selective hydrogenation catalyst in bed 84 in selective hydrogenation reactor 80 to mono-alkenes. A hydrogenated light naphtha stream in overhead hydrogenation effluent line 86 may be refluxed to the naphtha splitter column 16''' at a reflux inlet 16d. Hence, the naphtha splitter column 16''' is in downstream communication with the overhead selective hydrogenation reactor 80.

A net light naphtha stream is taken in line 88 from a side outlet 16e of the naphtha splitter column 16'. The reflux inlet 16d is positioned so the disulfides from the overhead selective hydrogenation reactor 80 will descend in the naphtha splitter column 16'. In an aspect, the reflux inlet 16d will be above the side outlets 16e, 16c and the bottoms outlet 16b. The description of the rest of FIG. 4 is as described for FIG. 3.

Figure 5:
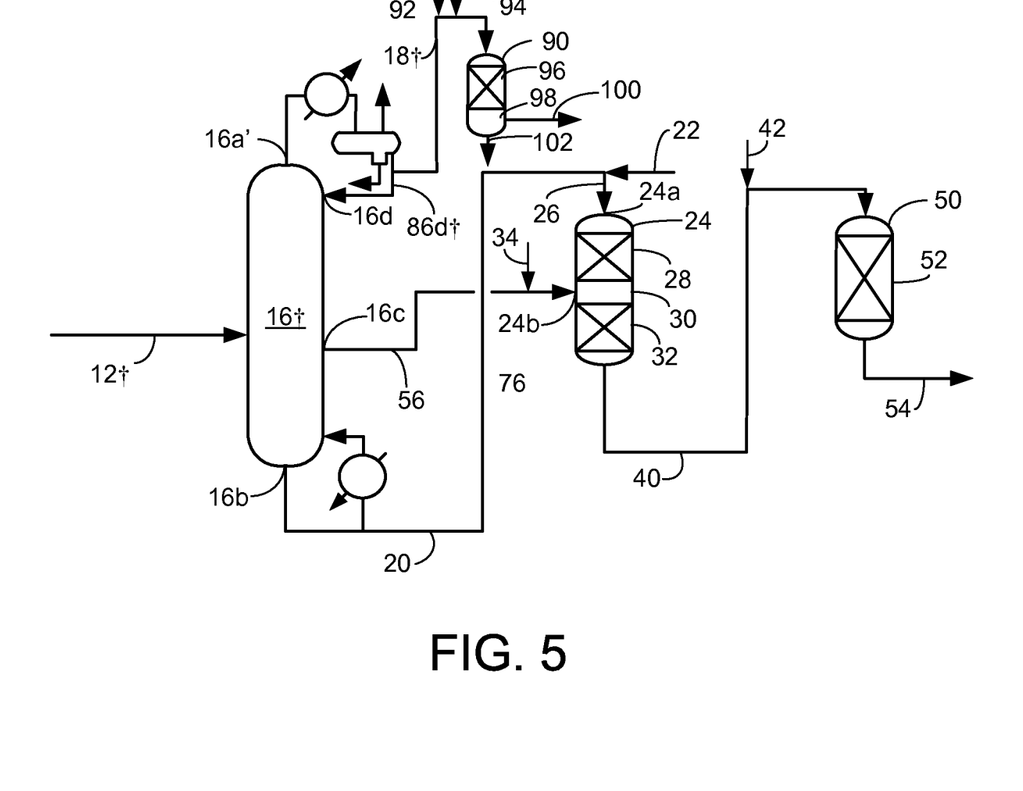
FIG. 5 is a schematic process flow diagram illustrating an even further alternative process and apparatus of the present invention.

FIG. 5 illustrates an alternative embodiment in which the overhead naphtha stream from the naphtha splitter column 16† is fed to a mercaptan reactor 90 instead of to a selective hydrogenation reactor 80. Many of the elements in FIG. 5 have the same configuration as in FIG. 4 and bear the same reference number. Elements in FIG. 5 that correspond to elements in FIG. 4 but have a different configuration bear the same reference numeral as in FIG. 4 but are marked with a cross symbol (†). In FIG. 5, the mercaptan reactor 60 in upstream communication with the naphtha splitter column 16† is optional but not illustrated.

The full range debutanized naphtha feed stream may be fed to the naphtha splitter column 16† and the intermediate naphtha stream in line 56 and the heavy naphtha in line 20 are processed as in FIGS. 2-4. However, a net overhead naphtha stream in a net overhead light naphtha line 18† is fed to an overhead mercaptan reactor 90 after it is mixed with an oxygen stream such as air in line 92 and an alkaline stream in line 94. The overhead mercaptan reactor is in downstream communication with an overhead outlet 16a' and the net overhead light naphtha line 18†. The residual overhead naphtha stream in line 86d† may be refluxed back to the naphtha splitter 16† through inlet 16d.

The overhead mercaptan reactor 90 comprises a catalyst bed 96 for contacting the light overhead naphtha stream with the alkaline stream over a mercaptan catalyst in the presence of oxygen at reaction conditions effective to oxidize the mercaptans to disulfide compounds to form an alkaline-containing, sweetened naphtha stream that contains the disulfide compounds. The mercaptan reactor 90 is in downstream communication with a source of alkaline from line 94.

A coalescing section 98 that may contain inert inorganic particulates, such as sand, is disposed in the mercaptan reactor 90 downstream from the catalyst bed 96. The alkali-containing, sweetened naphtha stream is passed along to the coalescing section 98 and contacts the inert inorganic particulates to coalesce and efficiently separate alkali from the sweetened naphtha stream for forming a alkali-depleted, sweetened naphtha stream. The sweetened light naphtha stream comprises light naphtha boiling range hydrocarbons and disulfide compounds. The sweetened light naphtha stream depleted of alkali is removed from the mercaptan reactor in line 100. In an aspect, the sweetened light naphtha stream may be recycled and fed to the to the naphtha splitter column 16† at or around inlet 16d. A separated alkaline stream is removed in line 102 and can be recycled to line 94 with or without intermediate regeneration of the alkaline stream.

In an aspect, the mercaptan reactor 90 may be a mercaptan extraction reactor to which oxygen stream 92 is not added. In this aspect, the sweetened light naphtha stream in line 100 depleted of organic sulfur could be sent directly to the gasoline pool; whereas the alkaline stream in line 102 with extracted mercaptides can be reacted in an oxidation reactor (not shown) to convert the mercaptides to disulfides which may be removed to regenerate the alkaline stream. The regenerated alkaline stream may be returned to line 94.

The description of the rest of FIG. 5 is as described for FIG. 4.

Specific Embodiments

While the following is described in conjunction with specific embodiments, it will be understood that this description is intended to illustrate and not limit the scope of the preceding description and the appended claims.

A first embodiment of the invention is a process for selective hydrogenation comprising mixing hydrogen with a heavy naphtha stream containing di-alkenes and having a first end point; selectively hydrogenating the heavy naphtha stream over a hydrogenation catalyst to produce a heavy hydrogenated naphtha stream with a lower concentration of di-alkenes; adding a lighter naphtha stream containing di-alkenes and having a second end point that is lower than the first end point to the heavy hydrogenated naphtha stream; and selectively hydrogenating the heavy hydrogenated naphtha stream and the lighter naphtha stream over hydrogenation catalyst to produce a product naphtha stream depleted of di-alkenes. An embodiment of the invention is one, any or all of prior embodiments in this paragraph up through the first embodiment in this paragraph further including separating a naphtha stream into the lighter naphtha stream and the heavy naphtha stream. An embodiment of the invention is one, any or all of prior embodiments in this paragraph up through the first embodiment in this paragraph wherein the cut point between the lighter naphtha stream and the heavy naphtha stream is between about 55° and about 75° C. An embodiment of the invention is one, any or all of prior embodiments in this paragraph up through the first embodiment in this paragraph further comprising hydrodesulfurizing the product naphtha stream over a hydrodesulfurization catalyst. An embodiment of the invention is one, any or all of prior embodiments in this paragraph up through the first embodiment in this paragraph further comprising contacting the naphtha stream with an alkaline stream to produce sulfides before the separation step. An embodiment of the invention is one, any or all of prior embodiments in this paragraph up through the first embodiment in this paragraph further comprising separating the naphtha stream into a light naphtha stream, an intermediate naphtha stream which is the lighter naphtha stream, and the heavy naphtha stream. An embodiment of the invention is one, any or all of prior embodiments in this paragraph up through the first embodiment in this paragraph further comprising selectively hydrogenating the light naphtha stream separately from selectively hydrogenating the heavy naphtha stream and the lighter hydrogenated naphtha stream to provide a hydrogenated light naphtha stream. An embodiment of the invention is one, any or all of prior embodiments in this paragraph up through the first embodiment in this paragraph further comprising refluxing the hydrogenated light naphtha stream to the separation step. An embodiment of the invention is one, any or all of prior embodiments in this paragraph up through the first embodiment in this paragraph further comprising contacting the light naphtha stream with an alkaline stream to produce sulfides.

A second embodiment of the invention is a process for selectively hydrogenating naphtha comprising separating a naphtha stream into a light naphtha stream, an intermediate naphtha stream, and a heavy naphtha stream; mixing hydrogen with the heavy naphtha stream containing di-alkenes and having a first end point; selectively hydrogenating the heavy naphtha stream over a first bed of hydrogenation catalyst to produce a heavy hydrogenated naphtha stream with a lower concentration of di-alkenes; adding the lighter naphtha stream containing di-alkenes and having a second end point that is lower than the first end point to the heavy hydrogenated naphtha stream; and selectively hydrogenating the heavy naphtha stream and the lighter hydrogenated naphtha stream over a second bed of hydrogenation catalyst to produce a product naphtha stream depleted of di-alkenes. An embodiment of the invention is one, any or all of prior embodiments in this paragraph up through the second embodiment in this paragraph wherein the cut point between the intermediate naphtha stream and the heavy naphtha stream is between about 55° and about 70° C. An embodiment of the invention is one, any or all of prior embodiments in this paragraph up through the second embodiment in this paragraph further comprising hydrodesulfurizing the product naphtha stream over a hydrodesulfurization catalyst. An embodiment of the invention is one, any or all of prior embodiments in this paragraph up through the second embodiment in this paragraph further comprising mixing the light naphtha stream with hydrogen and selectively hydrogenating the light naphtha stream to produce a hydrogenated light naphtha stream. An embodiment of the invention is one, any or all of prior embodiments in this paragraph up through the second embodiment in this paragraph further comprising refluxing the hydrogenated light naphtha stream to the separation step. An embodiment of the invention is one, any or all of prior embodiments in this paragraph up through the second embodiment in this paragraph further comprising contacting the naphtha stream with an alkaline stream to produce sulfides prior to the separation step. An embodiment of the invention is one, any or all of prior embodiments in this paragraph up through the second embodiment in this paragraph further comprising contacting the light naphtha stream with an alkaline stream to produce sulfides.

A third embodiment of the invention is a process for selectively hydrogenating naphtha comprising separating a naphtha stream into a lighter naphtha stream and a heavy naphtha stream; mixing hydrogen with the heavy naphtha stream containing di-alkenes and having a first end point; selectively hydrogenating the heavy naphtha stream over a first bed of hydrogenation catalyst to produce a heavy hydrogenated naphtha stream with a lower concentration of di-alkenes; adding a lighter naphtha stream containing di-alkenes and having a second end point that is lower than the first end point to the heavy hydrogenated naphtha stream; and selectively hydrogenating the lighter naphtha stream and the heavy hydrogenated naphtha stream over a second bed of hydrogenation catalyst to produce a product naphtha stream depleted of di-alkenes. An embodiment of the invention is one, any or all of prior embodiments in this paragraph up through the third embodiment in this paragraph further comprising contacting the naphtha stream with an alkaline stream to produce sulfides prior to the separation step. An embodiment of the invention is one, any or all of prior embodiments in this paragraph up through the third embodiment in this paragraph further comprising separating the naphtha stream into a light naphtha stream, an intermediate naphtha stream which is the lighter naphtha stream, and the heavy naphtha stream. An embodiment of the invention is one, any or all of prior embodiments in this paragraph up through the third embodiment in this paragraph further comprising selectively hydrogenating the light naphtha stream separately from selectively hydrogenating the heavy naphtha stream and the lighter hydrogenated naphtha stream to provide a hydrogenated light naphtha stream.

A fourth embodiment of the invention is an apparatus for selective hydrogenation comprising a fractionation column for producing a lighter naphtha stream at a lighter outlet and a heavy naphtha stream at a second outlet at a location in the column below the lighter outlet; and a selective hydrogenation reaction zone having a first inlet in downstream communication with the second outlet and a second inlet downstream of the first inlet and in downstream communication with the lighter outlet. An embodiment of the invention is one, any or all of prior embodiments in this paragraph up through the fourth embodiment in this paragraph further comprising an overhead outlet at a location in the column above the lighter outlet. An embodiment of the invention is one, any or all of prior embodiments in this paragraph up through the fourth embodiment in this paragraph further comprising a overhead selective hydrogenation reaction zone in downstream communication with the overhead outlet. An embodiment of the invention is one, any or all of prior embodiments in this paragraph up through the fourth embodiment in this paragraph wherein the fractionation column is in downstream communication with the overhead selective hydrogenation reaction zone. An embodiment of the invention is one, any or all of prior embodiments in this paragraph up through the fourth embodiment in this paragraph further comprising a mercaptan reactor in upstream communication with the fractionation column, the mercaptan reactor being in downstream communication with a source of alkaline. An embodiment of the invention is one, any or all of prior embodiments in this paragraph up through the fourth embodiment in this paragraph wherein the first inlet and the second inlet to the selective hydrogenation reaction zone are in the same vessel. An embodiment of the invention is one, any or all of prior embodiments in this paragraph up through the fourth embodiment in this paragraph further comprising an overhead mercaptan reactor in downstream communication with the overhead outlet. An embodiment of the invention is one, any or all of prior embodiments in this paragraph up through the fourth embodiment in this paragraph further comprising a hydrodesulfurization reactor downstream of the selective hydrogenation reaction zone.

A fifth embodiment of the invention is an apparatus for selective hydrogenation comprising a fractionation column for producing an overhead naphtha stream at an overhead outlet, a lighter naphtha stream at a lighter outlet and a heavy naphtha stream at a second outlet at a location in the column below the lighter outlet; and a selective hydrogenation reaction zone having a first inlet in downstream communication with the second outlet and a second inlet downstream of the first inlet and in downstream communication with the lighter outlet. An embodiment of the invention is one, any or all of prior embodiments in this paragraph up through the fifth embodiment in this paragraph wherein the overhead outlet is at a location in the column above the lighter outlet. An embodiment of the invention is one, any or all of prior embodiments in this paragraph up through the fifth embodiment in this paragraph further comprising a overhead selective hydrogenation reaction zone in downstream communication with the overhead outlet. An embodiment of the invention is one, any or all of prior embodiments in this paragraph up through the fifth embodiment in this paragraph wherein the fractionation column is in downstream communication with the overhead selective hydrogenation reaction zone. An embodiment of the invention is one, any or all of prior embodiments in this paragraph up through the fifth embodiment in this paragraph further comprising a mercaptan reactor in upstream communication with the fractionation column, the reactor being in downstream communication with a source of alkaline. An embodiment of the invention is one, any or all of prior embodiments in this paragraph up through the fifth embodiment in this paragraph wherein the first inlet and the second inlet to the selective hydrogenation reaction zone are in the same vessel. An embodiment of the invention is one, any or all of prior embodiments in this paragraph up through the fifth embodiment in this paragraph further comprising an overhead mercaptan reactor in downstream communication with the overhead outlet. An embodiment of the invention is one, any or all of prior embodiments in this paragraph up through the fifth embodiment in this paragraph further comprising a hydrodesulfurization reactor downstream of the selective hydrogenation reaction zone.

A sixth embodiment of the invention is an apparatus for selective hydrogenation comprising a mercaptan reactor being in downstream communication with a source of alkaline; a fractionation column in downstream communication with the mercaptan reactor for producing a lighter naphtha stream at a lighter outlet and a heavy naphtha stream at a second outlet at a location in the column below the lighter outlet; and a selective hydrogenation reaction zone having a first inlet in downstream communication with the second outlet and a second inlet downstream of the first inlet and in downstream communication with the lighter outlet. An embodiment of the invention is one, any or all of prior embodiments in this paragraph up through the sixth embodiment in this paragraph further comprising an overhead outlet at a location in the column above the lighter outlet. An embodiment of the invention is one, any or all of prior embodiments in this paragraph up through the sixth embodiment in this paragraph further comprising a overhead selective hydrogenation reaction zone in downstream communication with the overhead outlet and the fractionation column is in downstream communication with the overhead selective hydrogenation reaction zone. An embodiment of the invention is one, any or all of prior embodiments in this paragraph up through the sixth embodiment in this paragraph further comprising a hydrodesulfurization reactor downstream of the selective hydrogenation reaction zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for selective hydrogenation comprising:
    a fractionation column for producing a lighter naphtha stream at a lighter outlet and a heavy naphtha stream at a second outlet at a location in the column below the lighter outlet, and an overhead outlet at a location in the column above the lighter outlet;
    a selective hydrogenation reaction zone having a first inlet in downstream communication with the second outlet and a second inlet downstream of the first inlet and in downstream communication with the lighter outlet; and
    a overhead selective hydrogenation reaction zone in downstream communication with the overhead outlet and wherein said fractionation column is in downstream communication with said overhead selective hydrogenation reaction zone.

2. The apparatus of claim 1 further comprising a mercaptan reactor in upstream communication with the fractionation column, said mercaptan reactor being in downstream communication with a source of alkaline.

3. The apparatus of claim 1 wherein said first inlet and said second inlet to said selective hydrogenation reaction zone are in the same vessel.

4. The apparatus of claim 1 further comprising an overhead mercaptan reactor in downstream communication with said overhead outlet.

5. The apparatus of claim 1 further comprising a hydrodesulfurization reactor downstream of said selective hydrogenation reaction zone.

6. An apparatus for selective hydrogenation comprising:
    a fractionation column for producing an overhead naphtha stream at an overhead outlet, a lighter naphtha stream at a lighter outlet and a heavy naphtha stream at a second outlet at a location in the column below the lighter outlet, wherein the overhead outlet is at a location in the column above the lighter outlet;
    a selective hydrogenation reaction zone having a first inlet in downstream communication with the second outlet and a second inlet downstream of the first inlet and in downstream communication with the lighter outlet, wherein said first inlet and said second inlet to said selective hydrogenation reaction zone are in the same vessel; and
    an overhead selective hydrogenation reaction zone in downstream communication with the overhead outlet and wherein said fractionation column is in downstream communication with said overhead selective hydrogenation reaction zone.

7. The apparatus of claim 6 further comprising a mercaptan reactor in upstream communication with the fractionation column, said reactor being in downstream communication with a source of alkaline.

8. The apparatus of claim 6 further comprising an overhead mercaptan reactor in downstream communication with said overhead outlet.

9. The apparatus of claim 6 further comprising a hydrodesulfurization reactor downstream of said selective hydrogenation reaction zone.

10. An apparatus for selective hydrogenation comprising:
    a mercaptan reactor being in downstream communication with a source of alkaline;
    a fractionation column in downstream communication with said mercaptan reactor for producing a lighter naphtha stream at a lighter outlet and a heavy naphtha stream at a second outlet at a location in the column below the lighter outlet and an overhead outlet at a location in the column above the lighter outlet; and
    a selective hydrogenation reaction zone having a first inlet in downstream communication with the second outlet and a second inlet downstream of the first inlet and in downstream communication with the lighter outlet; and
    an overhead selective hydrogenation reaction zone in downstream communication with the overhead outlet and said fractionation column is in downstream communication with said overhead selective hydrogenation reaction zone.

11. The apparatus of claim 10 further comprising a hydrodesulfurization reactor downstream of said selective hydrogenation reaction zone.

\* \* \* \* \*